United States Patent
Kulakov et al.

(10) Patent No.: US 7,778,967 B2
(45) Date of Patent: Aug. 17, 2010

(54) SYSTEM AND METHOD FOR EFFICIENT MANAGEMENT OF DISTRIBUTED SPATIAL DATA

(75) Inventors: Dmitry Kulakov, Ottawa (CA); Yevgen Kamashev, Ottawa (CA); Boris Vorobiov, Ottawa (CA)

(73) Assignee: Ambercore Software Inc., Ottawa, Ontario (CA)

( * ) Notice: Subject to any disclaimer, the term of this patent is extended or adjusted under 35 U.S.C. 154(b) by 367 days.

(21) Appl. No.: 12/031,137

(22) Filed: Feb. 14, 2008

(65) Prior Publication Data
US 2009/0210426 A1 Aug. 20, 2009

(51) Int. Cl.
*G06F 17/30* (2006.01)

(52) U.S. Cl. .............. 707/610; 707/690; 707/706; 707/791; 707/822; 707/828

(58) Field of Classification Search .......... 707/600–831
See application file for complete search history.

(56) References Cited

U.S. PATENT DOCUMENTS 7,421,136 B2 * 9/2008 Sirohey et al. .............. 382/240

* cited by examiner

Primary Examiner—Isaac M Woo
(74) Attorney, Agent, or Firm—Robert A Vincent

(57) ABSTRACT

A system and method of providing efficient management of distributed, diversified, large sized spatial data as a scalable solution.

The system and method are based on the combination of the following:

Distributed spatial data is managed by spatial data servers which are deployed next to each spatial data source that needs to be accessed allowing spatial data to remain in the location where it was created. Spatial data indices allow fast delivery of large spatial data sets and are automatically updated whenever spatial data sets are modified.

Spatial meta servers coordinate the spatial data servers, publish the existence of the spatial data, define access permissions and communicate with other spatial meta severs extending the spatial data connectivity into other networks.

Spatial data providers deployed next to each location requiring access to the spatial data allow spatial data to be discovered and accessed directly from the spatial data servers.

2 Claims, 2 Drawing Sheets

SYSTEM AND METHOD FOR EFFICIENT MANAGEMENT OF DISTRIBUTED SPATIAL DATA

CROSS REFERENCE TO RELATED APPLICATIONS

None

FIELD OF INVENTION

The present invention relates to the field of spatial data management. In particular, to a system and method for efficient management of distributed spatial data.

BACKGROUND OF THE INVENTION

Introduction

The increasing accumulation of spatial data in all fields of science as well as the increasing capacity of data acquisition in industries such as oil & gas, mining, military, engineering, insurance etc. is giving rise to an exponentially growing volume of information. Spatial data is data which has some type of location component either explicitly such as a latitude, longitude and height or implicitly such as a zip code whose location is specified elsewhere. Information having a spatial data component has to be efficiently stored, maintained and made easily accessible for viewing by distributed customers.

There are dozens of spatial data formats that may exist within one enterprise serving different purposes but complementing the same business process. Viewing large distributed spatial data sets of different formats simultaneously by many clients becomes an essential task for the accurate decision making.

Problem Statement

Modern technologies are facing several major challenges trying to address the need described above. One is related to the inability to dynamically integrate different spatial data formats within one distributed system. This means for example that it is often technically impossible to view together spatial data sets that were made by different software packages even though they cover the same geographical extent.

Another challenge relates to the need to be able to view remote spatial data sets that have a significant amount of spatial information (typically measured in gigabytes). This ability is limited by the network bandwidth if using the traditional data organization approach. The problem becomes even more severe if there are many users in a network requiring simultaneous access to the voluminous spatial data.

A third challenge is to avoid data redundancy and the need for data synchronization, which are necessary when it is required to view large up-to-date data sets available on a server but produced elsewhere. It should also be realized that spatial information (such as maps, elevation models, 3D resource models and engineering drawings) are usually viewed as layers, which requires operating with large volumes of information within one transaction.

Existing Solution

The known approach for storing commonly available spatial data is to keep the data on a central corporate server and access it from remote computers. In the case of spatial information this usually involves excessive dataflow through the server and requires a large amount of processing power in order to serve many simultaneously connected clients with the requested information. This approach also requires frequently bringing large data sets to the server from analytical workstations where it was originally produced and keeping the data synchronized.

SUMMARY OF THE INVENTION

A system and method for providing efficient management of distributed, diversified, large sized spatial data as a scalable solution.

The system is based on the combination of the following:

Spatial data sources in a distributed data network are managed by spatial data servers which are deployed in a connected network next to each spatial data source that needs to be accessed. This allows the spatial data to remain in the location where it was created. Spatial data indices allow fast delivery of large spatial data sets and are automatically updated whenever spatial data sets are modified.

Spatial meta servers coordinate the spatial data servers 103, publish the existence of the spatial data, define access permissions and communicate with other spatial meta severs 101 extending the spatial data connectivity into other networks.

Spatial data providers, deployed in the connected network next to each location requiring access to the spatial data, allow spatial data to be discovered and accessed directly from the spatial data servers.

An exemplary sequence of steps in the method for efficient management of distributed spatial data is described below:

- deploy in a connected network a spatial data server at each spatial data source needing to be accessed;
- deploy in the connected network a spatial meta server on the same network as a plurality of spatial data servers;
- deploy in the connected network a spatial data provider at each location requiring spatial data access;
- the spatial meta server publishes (makes visible) specified spatial data of each spatial data server;
- the spatial meta server defines data access permissions for spatial data providers;
- the spatial data provider gives each network client (location requiring access to the spatial data) the ability to discover (see and access) spatial data;
- spatial data servers build spatial data indices for efficient spatial data transfer;
- indices are updated automatically each time the data changes;
- spatial data is transferred directly between the spatial data servers and the spatial data providers responsive to a request for spatial data;
- the same data exchange protocol is used for all data types;
- the spatial meta server extends communication across a wider network through many other spatial meta servers.

BRIEF DESCRIPTION OF THE DRAWINGS

The present invention will be described in conjunction with drawings in which.

DETAILED DESCRIPTION OF THE INVENTION

Figure 1:
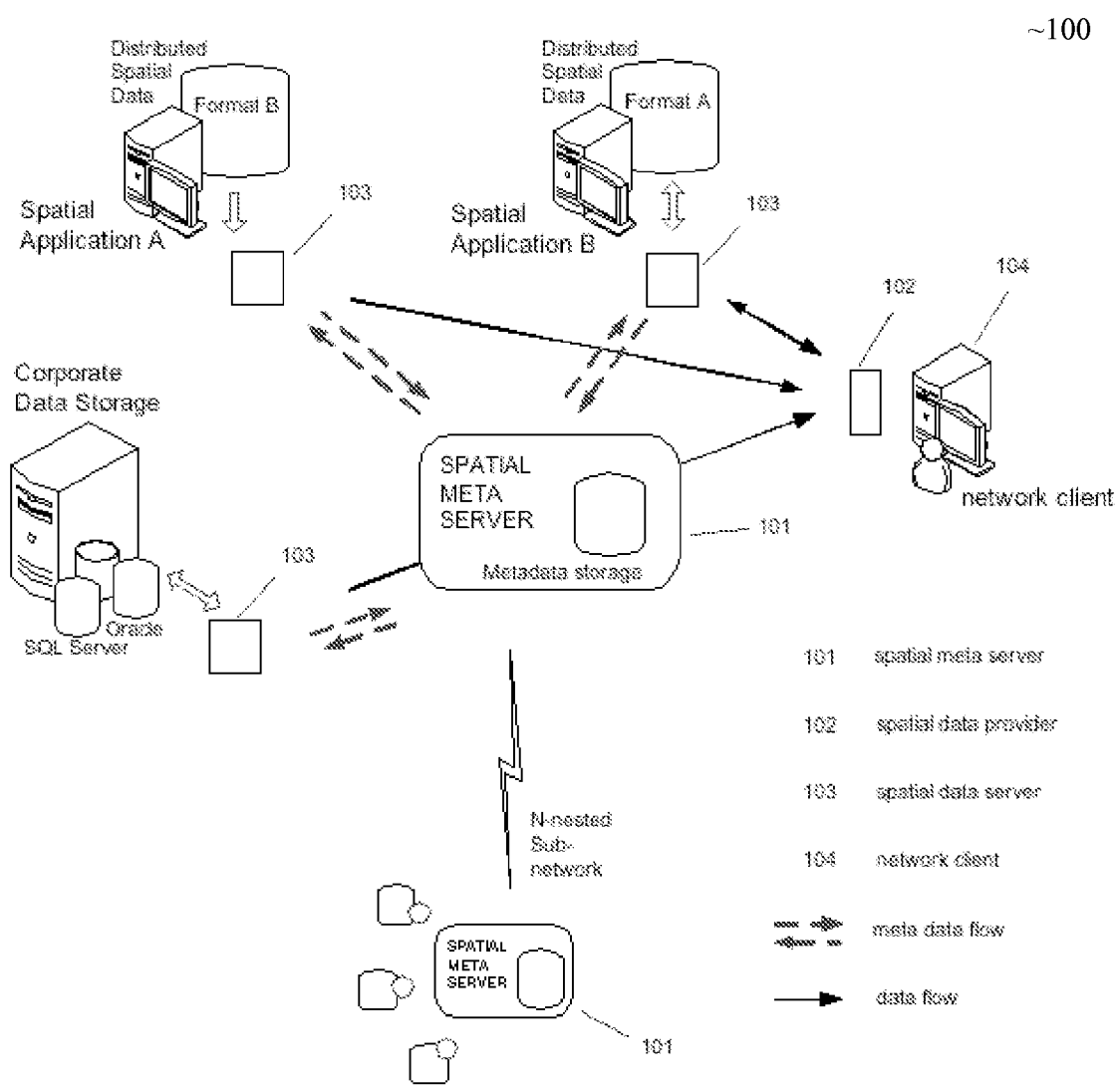
FIG. 1 is a schematic representation of an exemplary system for efficient management of distributed spatial data.

FIG. 1 is a schematic representation of an exemplary system 100 for efficient management of distributed spatial data.

The system 100 and method for efficient management of large sized distributed spatial data differentiates from existing solutions by managing distributed spatial data of large size at the location where the data was originally produced (or is being stored) instead of moving it to a central corporate server. This is achieved by creating a distributed system of interconnected active server components called spatial data servers 103 that are coordinated by the central spatial meta server 101.

Each spatial data server 103 is an active system component deployed and connected in the network next to each spatial data source. This means that spatial data can remain in the location where it was created as distributed spatial data.

Each spatial data server 103:
1. Keeps a register of spatial data to be published and informs the spatial meta server 101 of the data availability.
2. Builds spatial data indices for fast data access.
3. Automatically updates the spatial data indices whenever the data is changed.
4. Provides access to the spatial data.
5. Supports communication with spatial data providers 102.

Diversified spatial data access is supported by these spatial data servers 103 because each spatial data server 103 is built to handle a specific data source type (i.e. vendor specific spatial databases, or vendor specific flat file based repositories), and yet support the same data exchange protocol, allowing network clients 104, who wish to access the spatial data, to efficiently access distributed spatial data regardless of the actual data format.

Efficient large sized spatial data management is achieved by the spatial data servers 103 which build spatial data indices for the data sets at their location. The indices have a hierarchical structure to allow large data sets to be transmitted efficiently but these indices require extra overhead to build them. Therefore spatial data servers are also equipped with a mechanism that allows for dynamic data change recognition. This allows the spatial data servers 103 to automatically build and update spatial indices at their location in advance of being queried. Spatial data servers 103 can also forward their spatial data after it is updated, thus providing network clients 104 with up-to-date information as soon as it becomes available within the network.

The spatial meta server 101 works as a central coordinating component for a defined portion of a local area network or a wide area network and is responsible for:
1. Keeping metadata network info (i.e. data topology, location etc.).
2. Controlling which data sets can be accessed.
3. Controlling which users have permission to access certain data.
4. Regulating data flows based on network capacities.

The spatial meta server 101 manages the information about spatial data maintained by all the distributed spatial data servers 103 available within its network domain. The spatial meta server 101 controls all the spatial data layers, belonging to all the spatial data servers 103 within its domain, by dictating which are allowed to be accessed. It also defines network client 104 permissions to access certain data.

Extensive scalability is achieved by the ability to update the data management network topology dynamically by adding/removing/reconfiguring spatial data server 103 components without any interruption of data access. Furthermore, the spatial meta server 101 communicates with other spatial meta servers 101 to extend the system 100 into other networks.

Each spatial data provider 102 is connected to an adjacent network client 104 and provides this adjacent network client 104 with data access capabilities. The spatial data providers 102 are responsible for spatial data exchange directly between multiple spatial data servers 103 and the network clients 104 which they are serving. In an exemplary embodiment the network client 104 can be implemented using computer executable instructions stored on a computer readable storage mechanism.

Each of the spatial data servers 103 can serve multiple network clients 104 at the same time through the spatial data provider 102 next to each network client 104.

Figure 2:
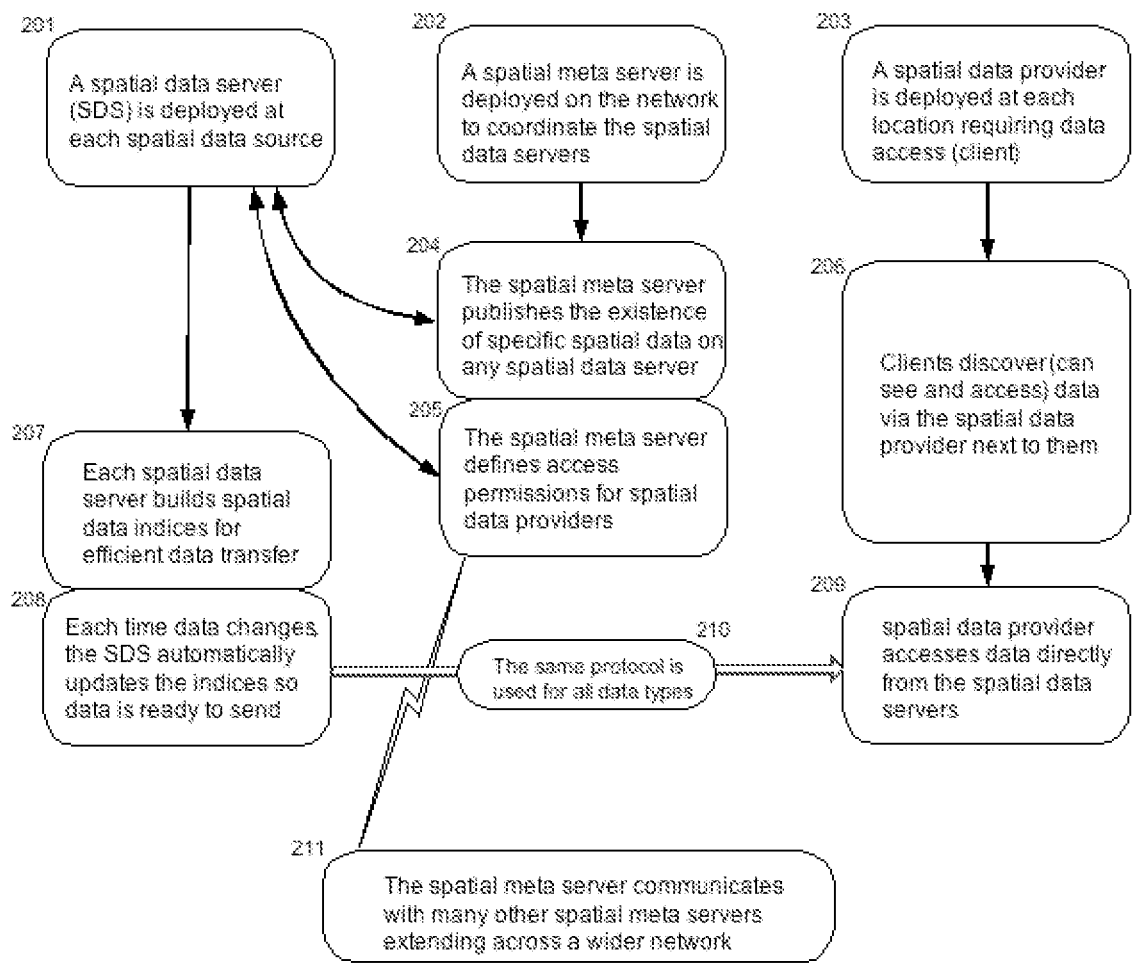
FIG. 2 is a flowchart of steps in an exemplary method for efficient management of distributed spatial data.

FIG. 2 is a flowchart of steps in an exemplary method 200 for efficient management of distributed spatial data. The steps are described below:

In step 201, spatial data servers 103 are deployed so that one spatial data server 103 is in network connectivity with a spatial data source at each location of the spatial data storage intended for remote usage across a large distributed network. The spatial data servers 103 monitor the data sets available at their particular data storage location.

In step 202 a spatial meta server 101 is deployed in connectivity with a network to coordinate and manage the spatial data servers 103 within its domain of control.

In step 203 spatial data providers 102 are deployed so that one spatial data provider 102 is at each network client 104 location requiring access to the spatial data.

In step 204 the spatial meta server 101 publishes (i.e. makes visible in the network) the existence of selected specified spatial data sets via each of the distributed spatial data servers 103.

In step 205 the spatial meta server 101 defines access permissions for spatial data providers 102. After the publishing is completed, the distributed spatial data servers 103 are then ready to provide network clients 104 with remote spatial data when requested.

In step 206 network clients 104 discover (i.e. can detect and access across the network) distributed published spatial data via the spatial data provider 102 situated at their location and are able to use the remote data for viewing or processing.

In step 207 each spatial data server 103 builds spatial data indices for efficient data transfer.

In step 208 the distributed spatial data servers 103 keep track of any change to the published data at their location. Each time the spatial data changes, the spatial data server 103 automatically updates the spatial data indices so that the latest spatial data is always ready to send. Spatial data servers 103 can also forward their spatial data after it is updated.

In step 209, when queried by the network clients 104, the spatial data providers 102 access data across the network directly from the spatial data servers 103.

In step 210, all data access between the spatial data servers 103 and the spatial data providers 102 takes place using the same data exchange protocol for all spatial data types in order to achieve data source and data type independence.

In step 211 each spatial meta server 101 in a network automatically communicates with many other spatial meta servers 101 in adjacent connected networks. This expands and controls the accessibility of distributed data into and across all interconnected networks.

It will be apparent to one skilled in the art that numerous modifications and departures from the specific embodiments described herein may be made without departing from the spirit and scope of the present invention.

What is claimed is:

1. A system for efficient management of distributed spatial data, different portions of the spatial data stored in each of a plurality of spatial data sources in any of a plurality of data formats, each spatial data source connected to one of a plurality of networks, the system comprising:

a plurality of spatial data servers, each spatial data server deployed next to and connected to a different one of the spatial data sources, for:
transmitting spatial data using a common spatial data exchange protocol;
building hierarchical spatial data indices;
updating the indices automatically whenever spatial data sets are modified; and
forwarding spatial data responsive to an update of the spatial data;

a plurality of spatial meta servers, each connected to one or more spatial data servers via one of the networks, for:
publishing the existence of specified spatial data on any of the spatial data servers to which it is connected;
defining access permissions for the published spatial data; and
communicating with other spatial meta severs for extending connectivity and spatial data publication to the other networks; and a plurality of spatial data providers, each connected to one of a plurality of network clients, for:
allowing the network client to discover the spatial data; and
accessing spatial data directly from the spatial data servers.

2. A method for efficient management of distributed spatial data comprising the steps of:

deploying one of a plurality of spatial data servers in network connectivity with one of a plurality of spatial data sources;
deploying a spatial meta server in network connectivity with one or more spatial data servers;
deploying one of a plurality of spatial data providers in network connectivity at each of a plurality of locations requiring access to the spatial data sources;
publishing the existence of specified spatial data on each of the spatial data servers;
defining spatial data access permissions for each of the spatial data providers;
discovering, at each location requiring access to the spatial data sources, the spatial data via the spatial data provider deployed at the location;
building spatial data indices for the spatial data on each of the spatial data sources;
updating the spatial data indices automatically each time the spatial data changes on any of the spatial data sources;
transferring spatial data directly between the spatial data servers and the spatial data providers responsive to a request for spatial data;
forwarding updated spatial data to the spatial data providers automatically when data changes occur;
using a common data exchange protocol for all spatial data transfers;
extending discovery and transfer of the spatial data, through the spatial meta server, to further spatial meta servers each connected to one of the other networks.

* * * * *